(12) United States Patent
Davis

(10) Patent No.: US 9,725,842 B2
(45) Date of Patent: Aug. 8, 2017

(54) WASHING MACHINE APPLIANCE AND SUSPENSION ASSEMBLY FOR SAME

(71) Applicant: General Electric Company, Schenectady, NY (US)

(72) Inventor: Paul Owen Davis, Prospect, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 186 days.

(21) Appl. No.: 14/595,275

(22) Filed: Jan. 13, 2015

(65) Prior Publication Data

US 2016/0201244 A1    Jul. 14, 2016

(51) Int. Cl.
| | |
|---|---|
| *D06F 37/20* | (2006.01) |
| *D06F 37/24* | (2006.01) |
| *D06F 39/00* | (2006.01) |
| *F16F 15/04* | (2006.01) |
| *G01B 11/14* | (2006.01) |
| *D06F 33/02* | (2006.01) |
| *D06F 37/22* | (2006.01) |

(52) U.S. Cl.
CPC ............ *D06F 39/003* (2013.01); *D06F 33/02* (2013.01); *D06F 37/203* (2013.01); *D06F 37/22* (2013.01); *D06F 37/24* (2013.01); *F16F 15/04* (2013.01); *G01B 11/14* (2013.01); *D06F 2202/10* (2013.01); *D06F 2222/00* (2013.01)

(58) Field of Classification Search
CPC ........ D06F 33/02; D06F 37/203; D06F 37/22; D06F 37/24; D06F 37/38; D06F 39/003; D06F 2202/02; D06F 2202/10; D06F 2202/065; D06F 2202/085; D06F 2216/00; D06F 2220/00; D06F 2222/00
See application file for complete search history.

(56) References Cited

U.S. PATENT DOCUMENTS

| | | | | |
|---|---|---|---|---|
| 4,742,698 | A * | 5/1988 | Torita | D06F 39/003 68/12.04 |
| 5,946,946 | A * | 9/1999 | Sharp | D06F 37/20 188/129 |
| 6,065,170 | A * | 5/2000 | Jang | D06F 37/203 68/12.04 |
| 6,460,381 | B1 * | 10/2002 | Yoshida | D06F 37/203 68/12.04 |

(Continued)

FOREIGN PATENT DOCUMENTS

| | | |
|---|---|---|
| GB | 583080 A | 12/1946 |
| JP | 08-071290 | 3/1996 |

(Continued)

*Primary Examiner* — Joseph L Perrin
(74) *Attorney, Agent, or Firm* — Dority & Manning, P.A.

(57) ABSTRACT

Washing machine appliances and suspension assemblies for suspending tubs in washing machine appliances are provided. A suspension assembly includes a frame, a mount seated on the frame, and a rod coupled to the mount. The rod is rotatable about a pivot point. The suspension assembly further includes a sensor assembly operable to monitor rotation of the rod. The sensor assembly includes a sensor and a reference surface. One of the sensor or the reference surface is coupled to the rod and rotatable with the rod relative to the other of the sensor or the reference surface. The sensor is operable to measure reference distances from the reference surface.

16 Claims, 12 Drawing Sheets

(56) References Cited

U.S. PATENT DOCUMENTS

| | | | |
|---|---|---|---|
| 6,983,657 B1 * | 1/2006 | Kakutani | D06F 37/24 73/779 |
| 2006/0059960 A1 | 3/2006 | Hansen | |
| 2007/0039359 A1 * | 2/2007 | Lee | G01H 9/00 68/23.1 |
| 2011/0113567 A1 * | 5/2011 | Lee | D06F 39/003 8/137 |
| 2012/0060299 A1 * | 3/2012 | Kim | D06F 21/08 8/137 |
| 2012/0279263 A1 * | 11/2012 | Eglmeier | D06F 27/04 68/12.23 |

FOREIGN PATENT DOCUMENTS

| | | |
|---|---|---|
| JP | 08164295 | 6/1996 |
| JP | 3688896 B2 | 1/2000 |
| KR | 2004 0092758 A | 11/2004 |
| WO | WO 2013/002652 | 1/2013 |

* cited by examiner

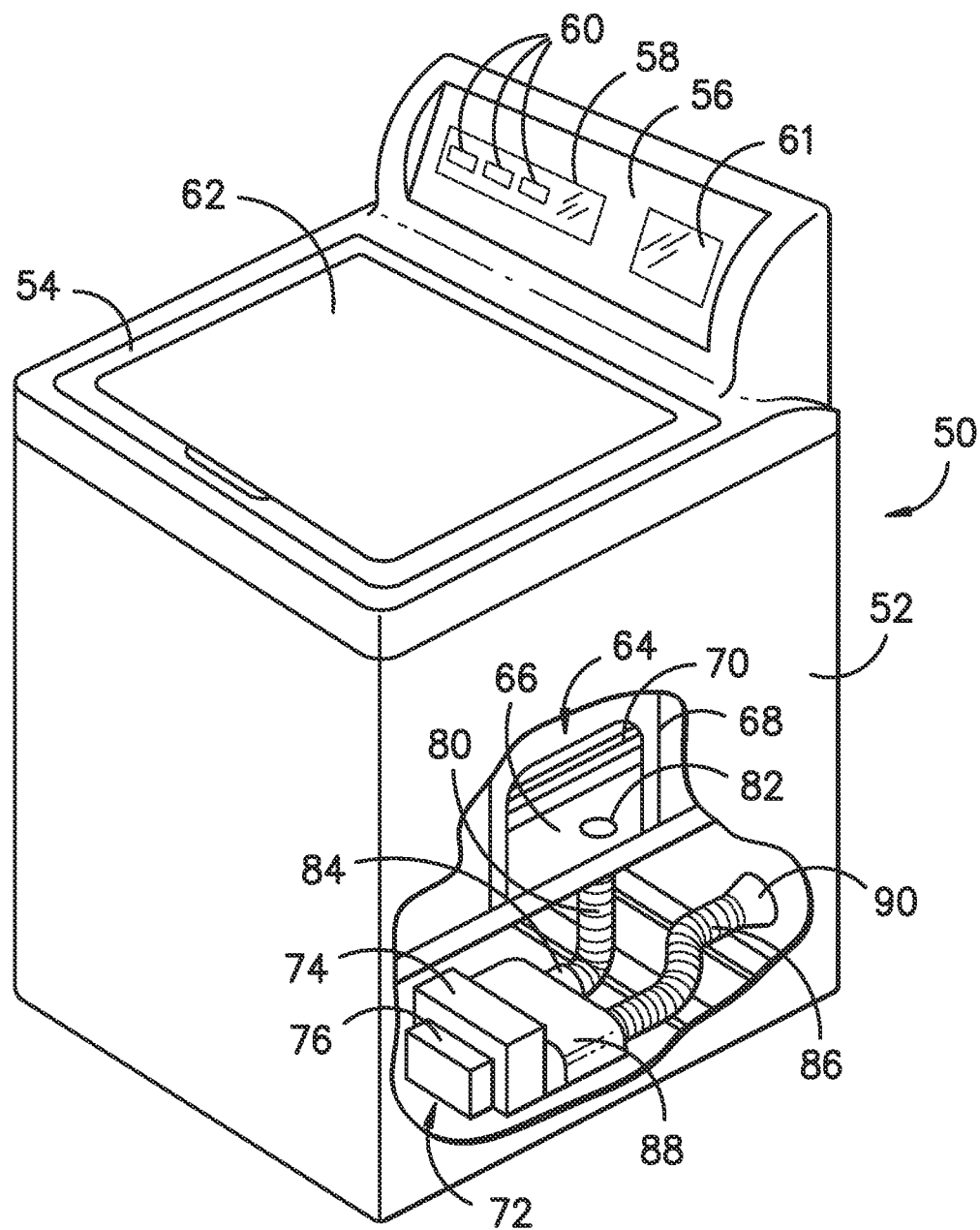
FIG. -1-

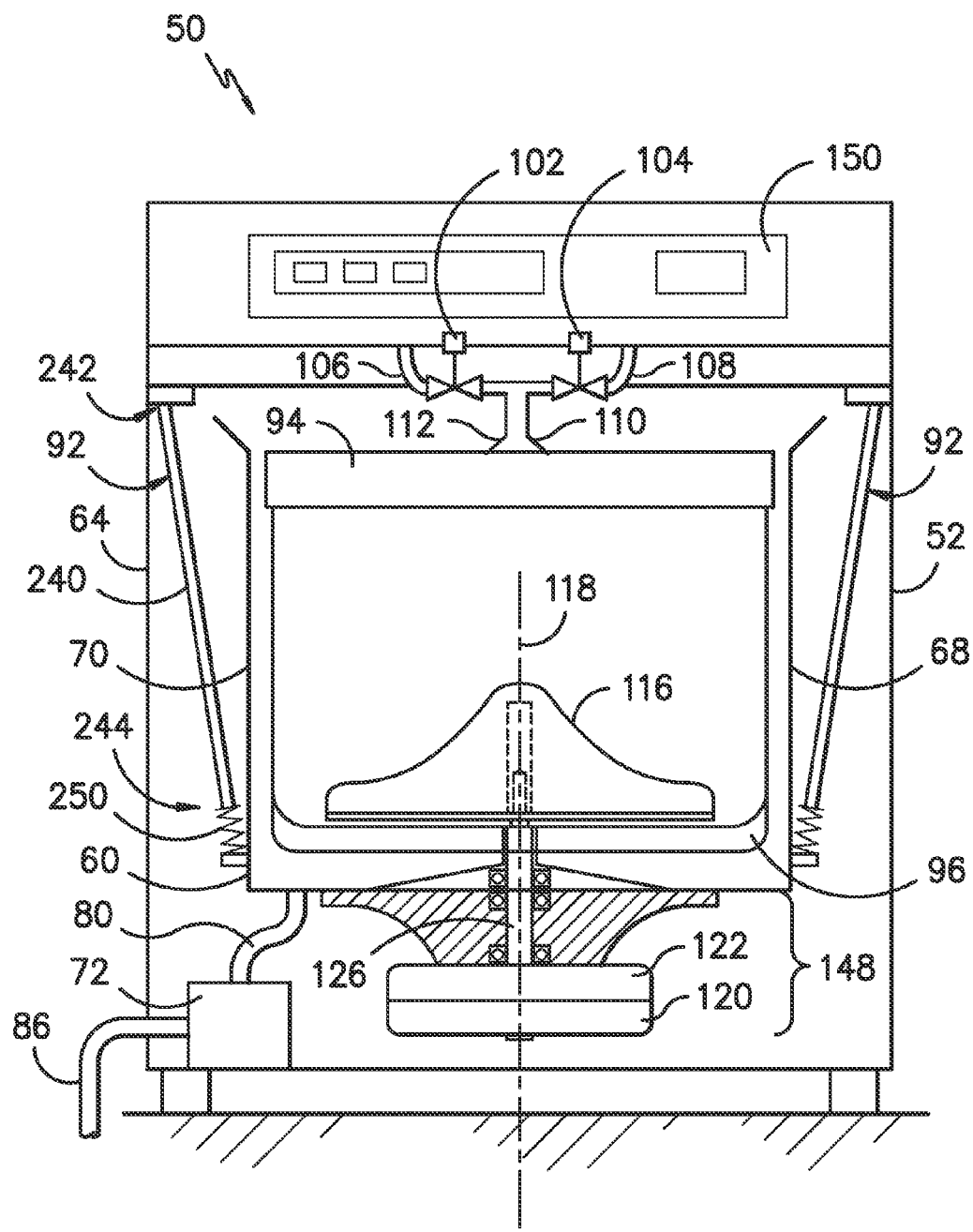
FIG. -2-

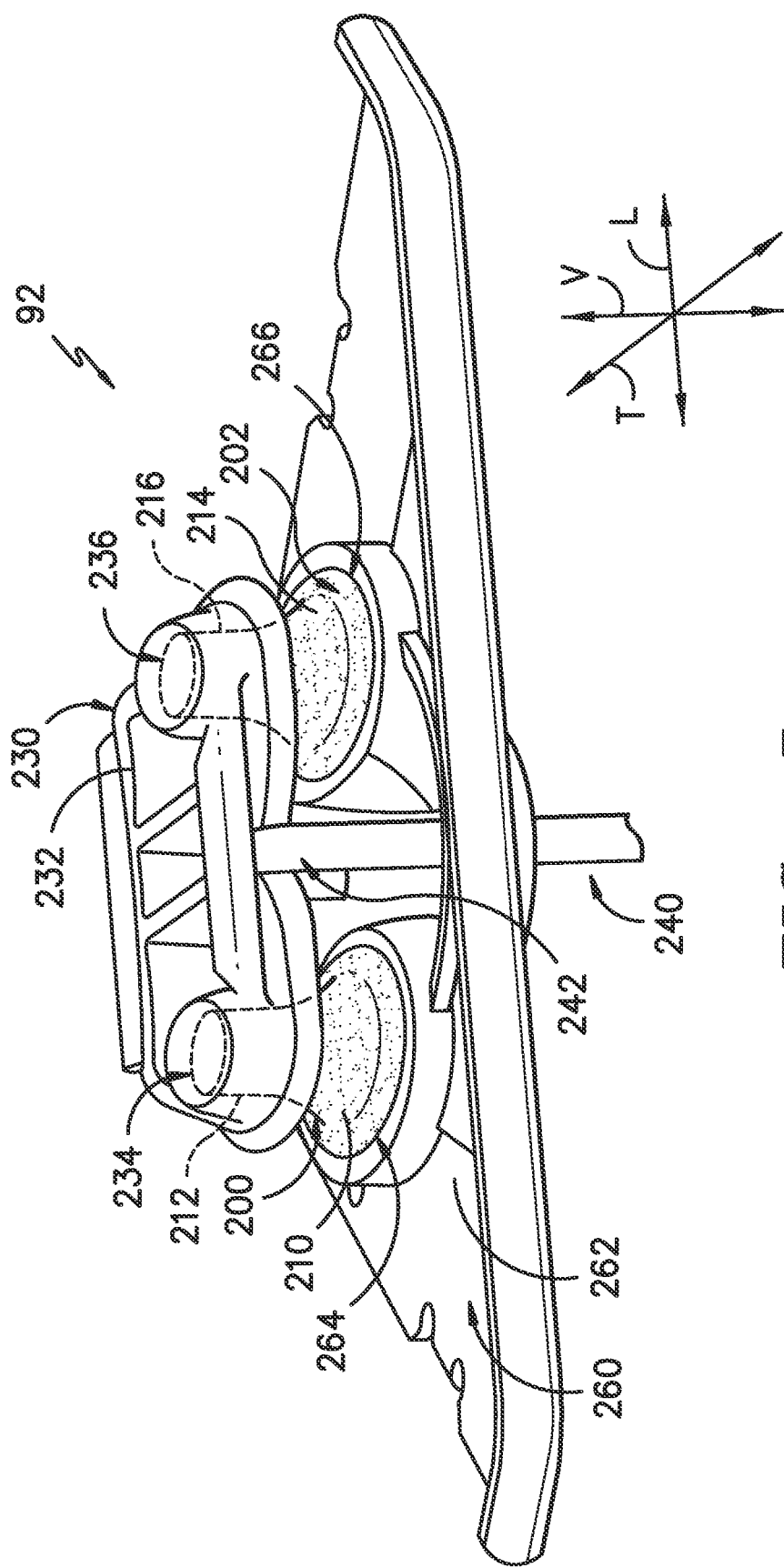
FIG. -3-

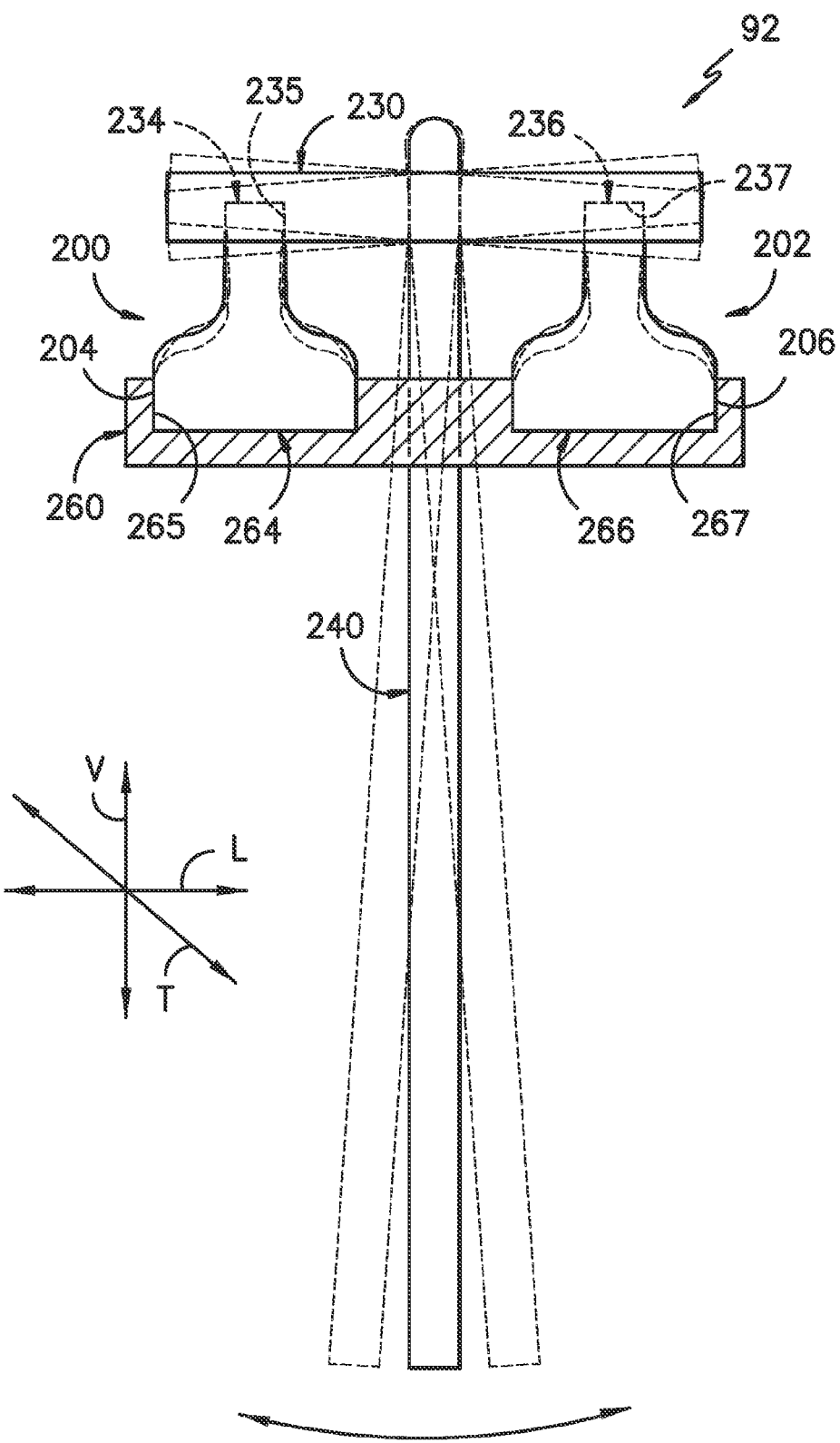
FIG. -4-

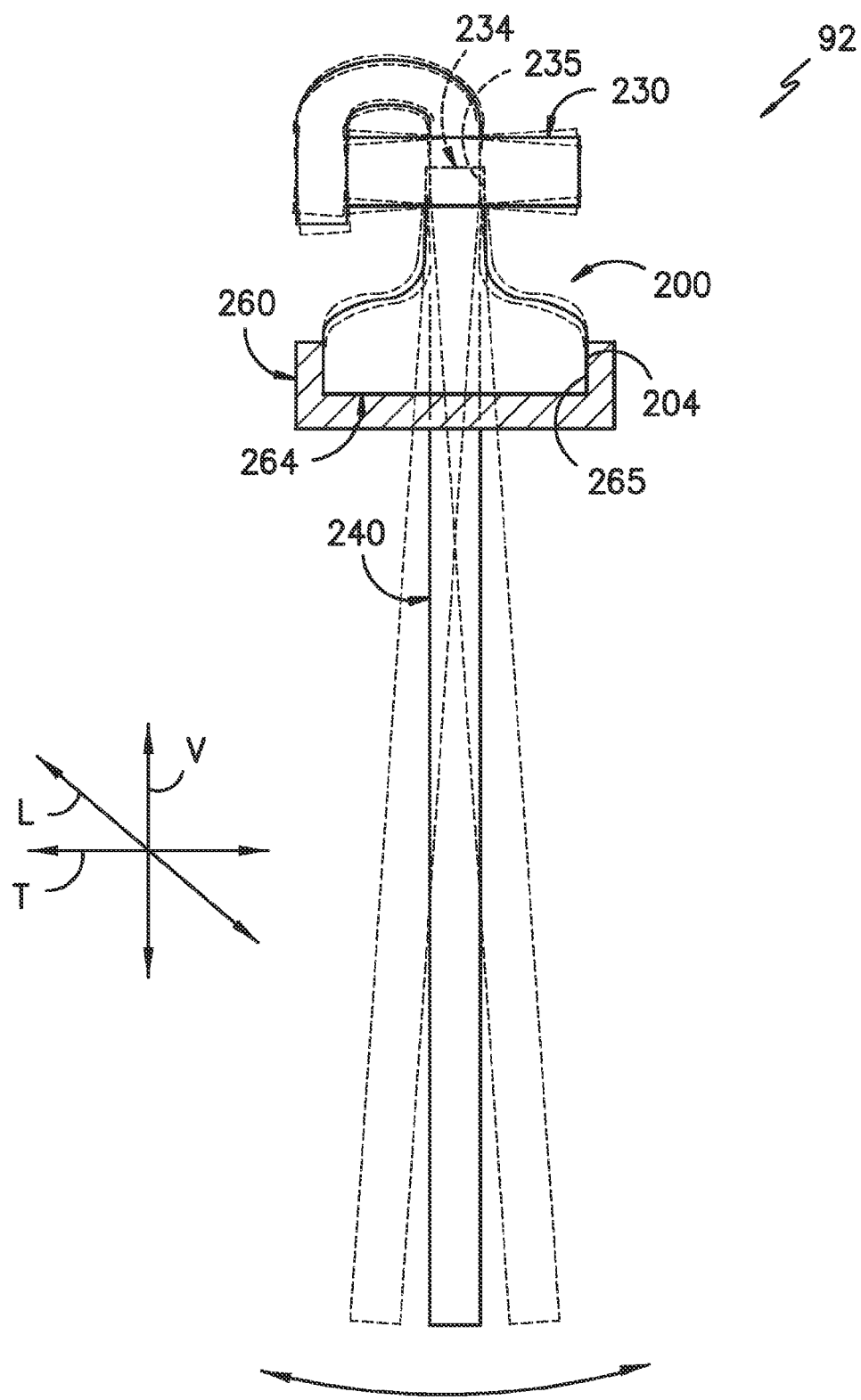
FIG. -5-

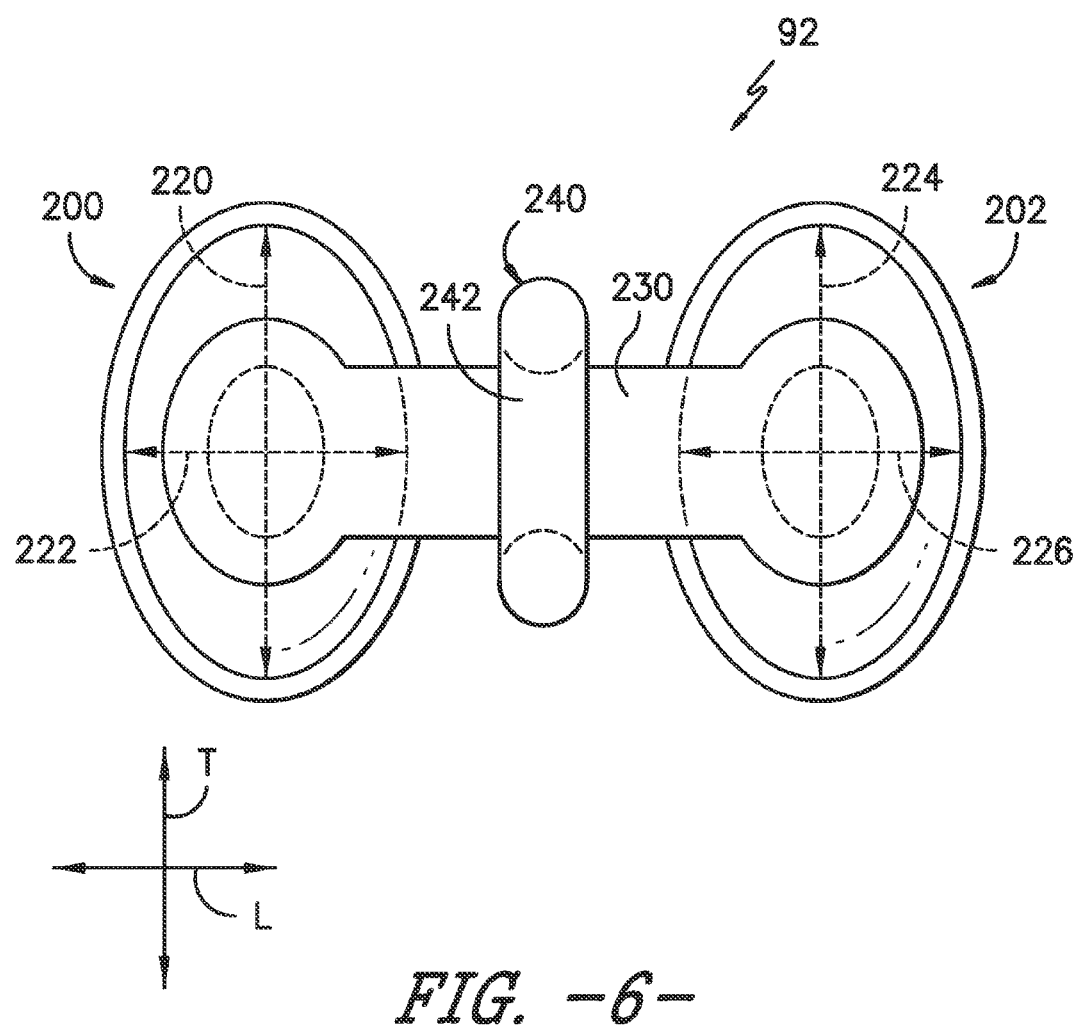
FIG. -6-

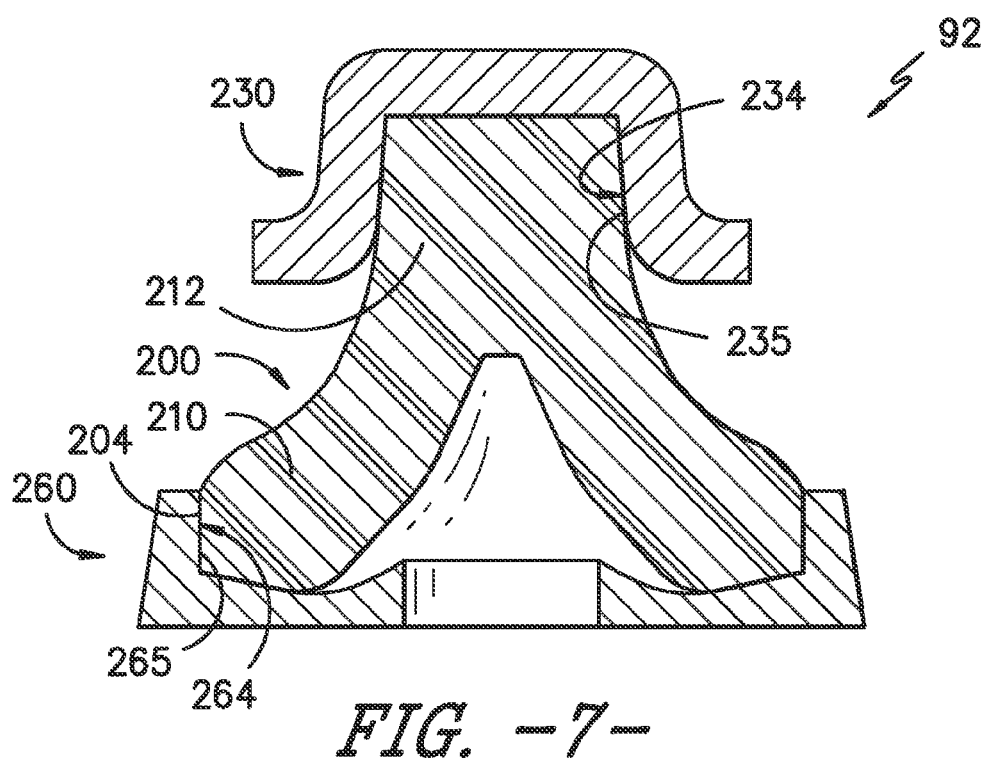
FIG. -7-
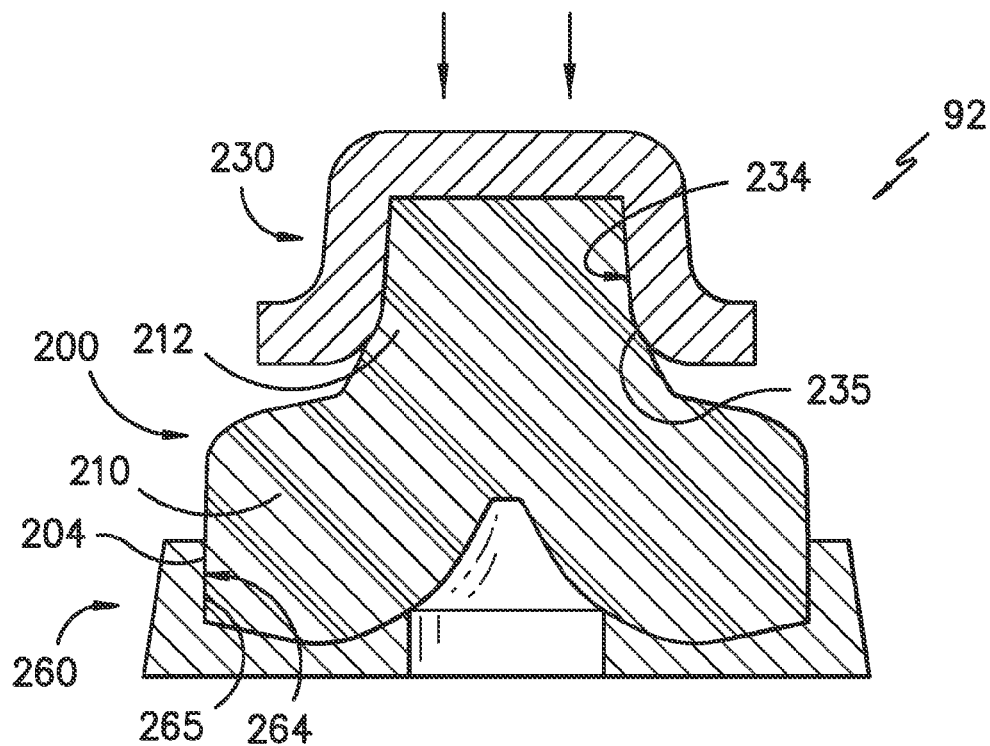
FIG. -8-

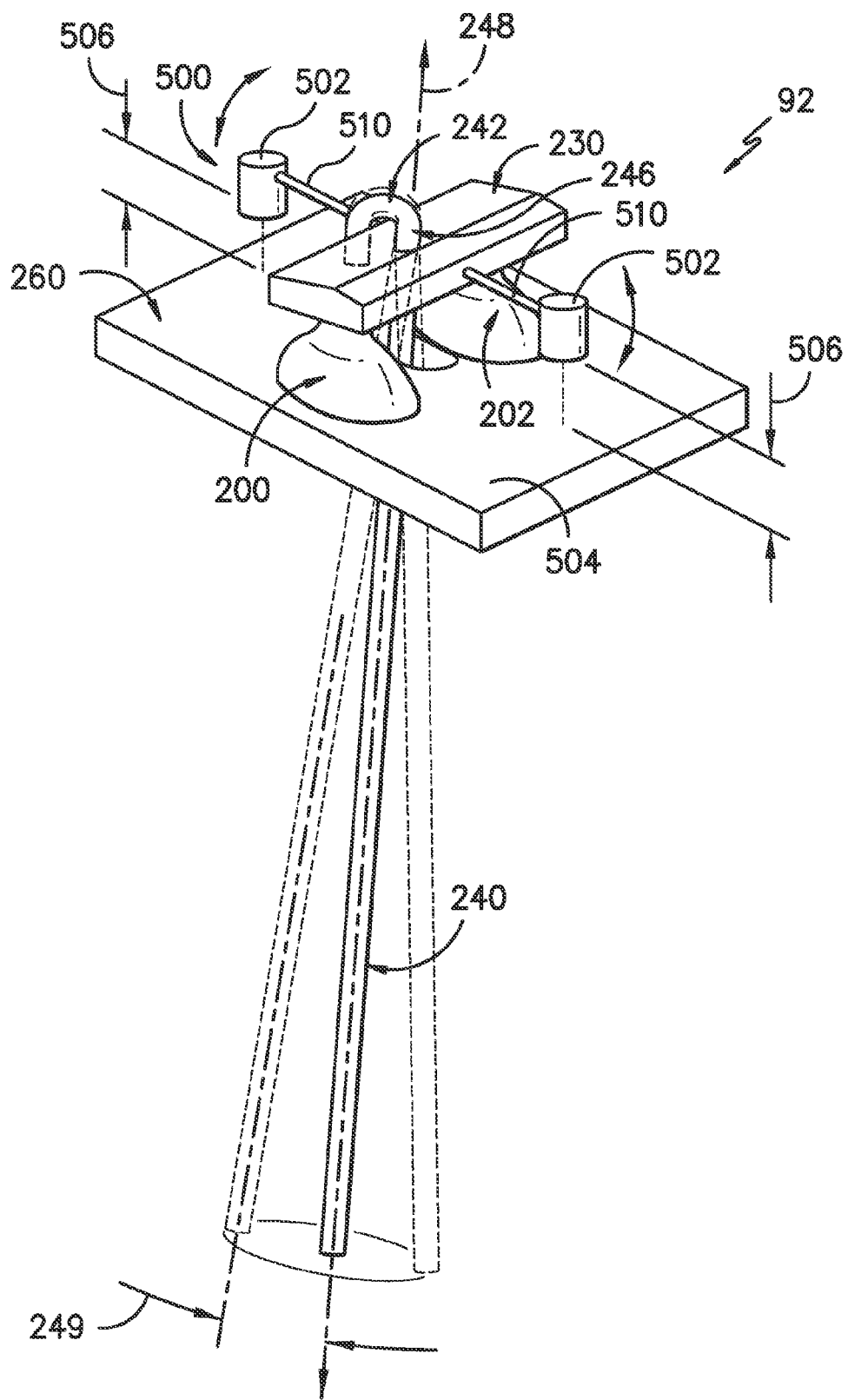
FIG. -9-

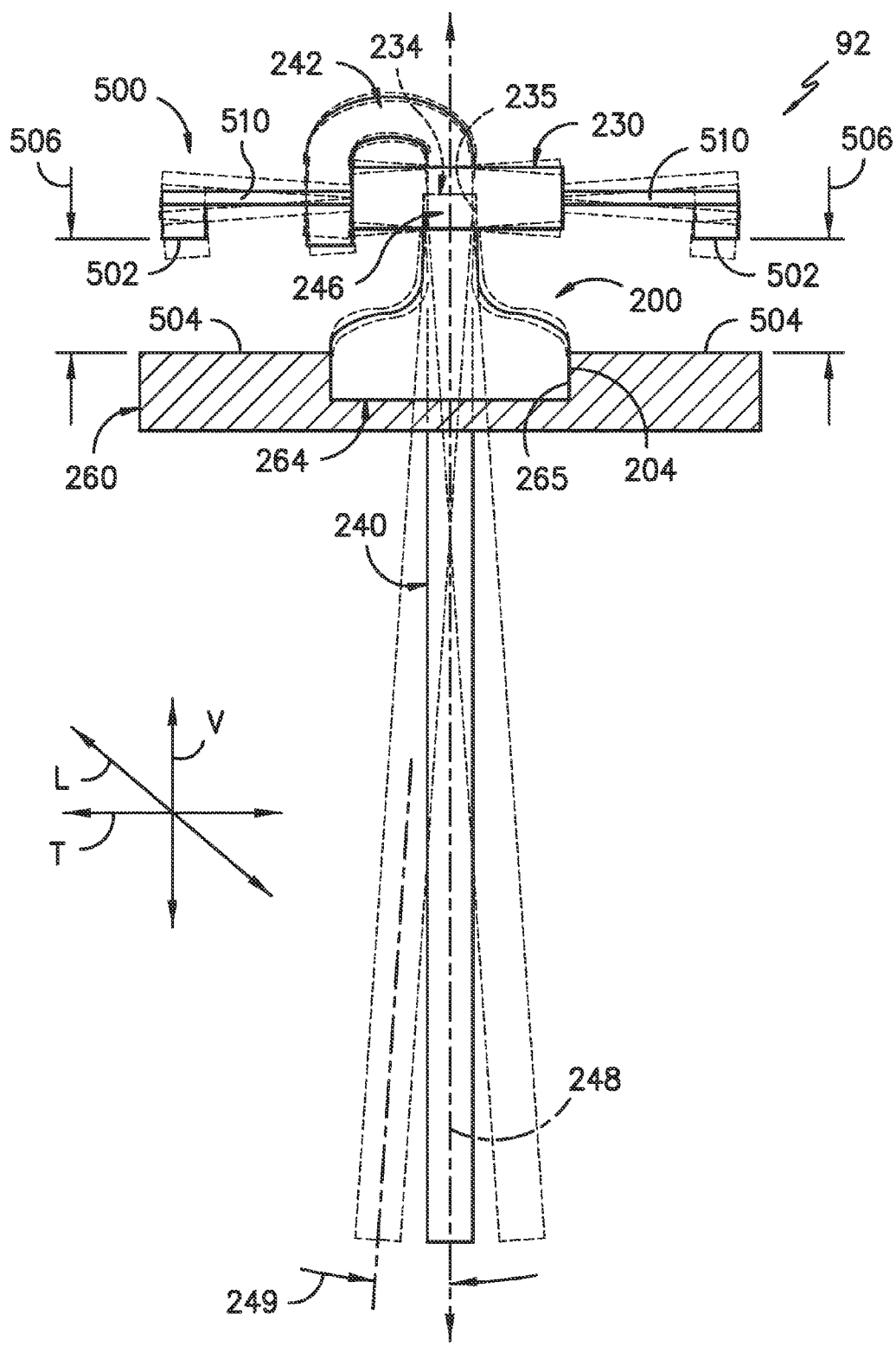
FIG. -10-

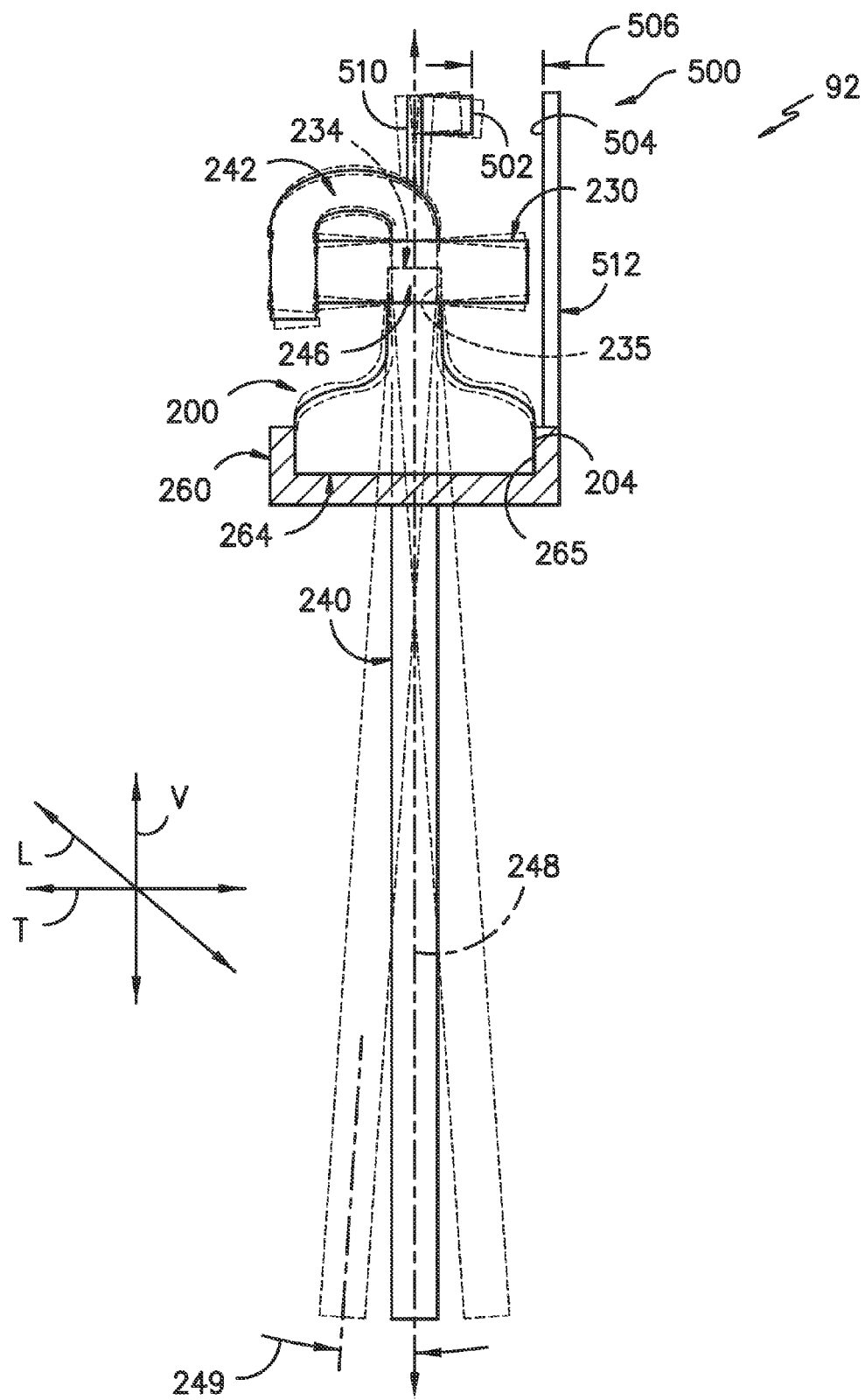
FIG. -11-

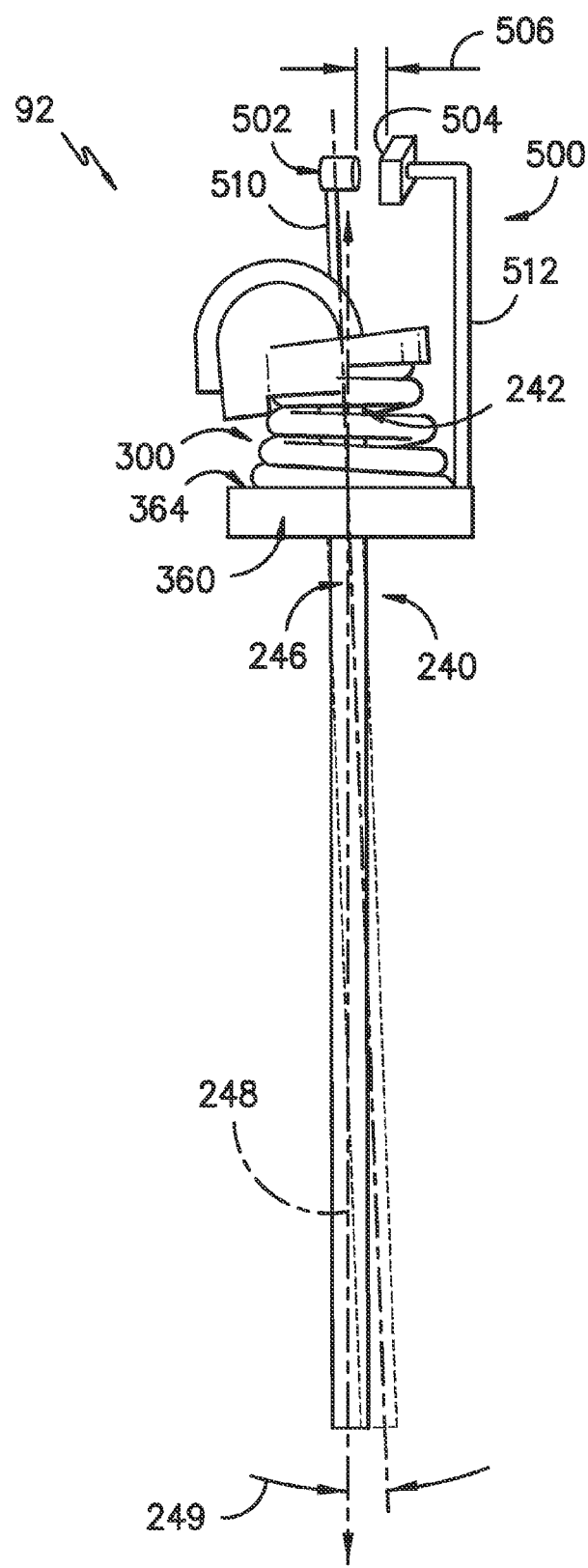
FIG. -12-

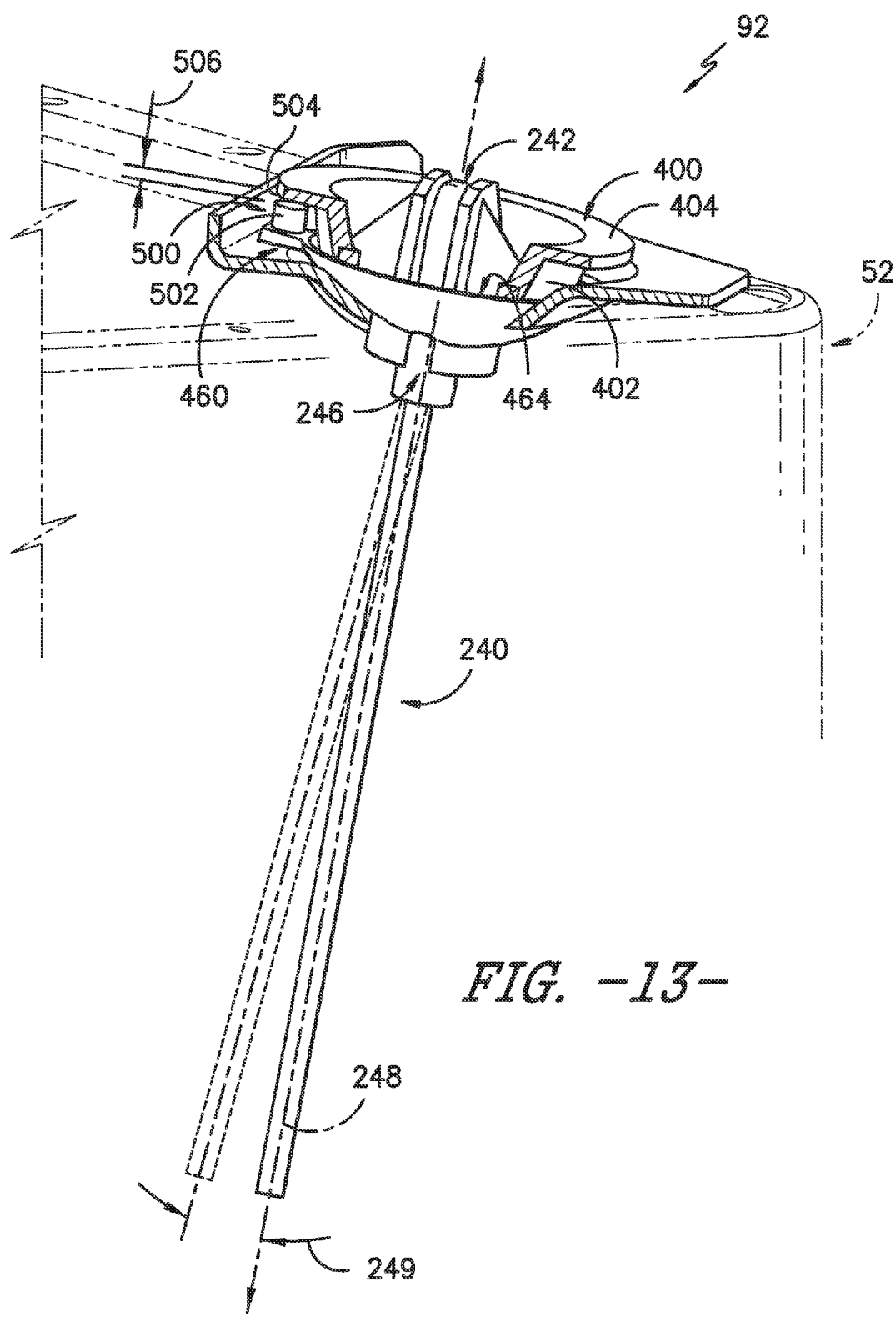
FIG. -13-

WASHING MACHINE APPLIANCE AND SUSPENSION ASSEMBLY FOR SAME

FIELD OF THE INVENTION

The present subject matter relates generally to washing machine appliances, such as vertical axis washing machine appliances, and suspension assemblies for washing machine appliances. In particular, the present subject matter relates to suspension assemblies which facilitate monitoring movement of the tub relative to the cabinet.

BACKGROUND OF THE INVENTION

Washing machine appliances generally include a cabinet which receives a tub for containing wash and rinse water. A wash basket is rotatably mounted within the wash tub. A drive assembly is coupled to the wash tub and configured to rotate the wash basket within the wash tub in order to cleanse articles within the wash basket. Upon completion of a wash cycle, a pump assembly can be used to rinse and drain soiled water to a draining system.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances typically have the wash tub suspended in the cabinet with suspension devices. The suspension devices generally allow the tub to move relative to the cabinet during operation of the washing machine appliance.

While such suspension devices generally allow such movement, excess movement of the tub relative to the cabinet is generally considered undesirable, and can for example indicate the existence of an out of balance load. Accordingly, improved apparatus for monitoring such movement of the tub would be desirable.

BRIEF DESCRIPTION OF THE INVENTION

In accordance with one embodiment, a suspension assembly for suspending a tub in a washing machine appliance is provided. The suspension assembly includes a frame, a mount seated on the frame, and a rod coupled to the mount. The rod is rotatable about a pivot point. The suspension assembly further includes a sensor assembly operable to monitor rotation of the rod. The sensor assembly includes a sensor and a reference surface. One of the sensor or the reference surface is coupled to the rod and rotatable with the rod relative to the other of the sensor or the reference surface. The sensor is operable to measure reference distances from the reference surface.

In accordance with another embodiment, a washing machine appliance is provided. The washing machine appliance includes a cabinet, and a tub disposed within the cabinet. The washing machine appliance further includes a plurality of suspension assemblies suspending the tub within the cabinet. Each of the plurality of suspension assemblies includes a frame, a mount seated on the frame, and a rod coupled to the mount. The rod is rotatable about a pivot point. Each of the plurality of suspension assemblies further includes a sensor assembly operable to monitor rotation of the rod. The sensor assembly includes a sensor and a reference surface. One of the sensor or the reference surface is coupled to the rod and rotatable with the rod relative to the other of the sensor or the reference surface. The sensor is operable to measure reference distances from the reference surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance, with a portion of a cabinet of the washing machine appliance shown broken away in order to reveal certain interior components of the washing machine appliance, in accordance with one embodiment of the present disclosure;

FIG. 2 provides a front elevation schematic view of various components of the washing machine appliance of FIG. 1.

FIG. 3 is a perspective view of components of a suspension assembly for a washing machine appliance in accordance with one embodiment of the present disclosure;

FIG. 4 is a front schematic view of components of a suspension assembly for a washing machine appliance in accordance with one embodiment of the present disclosure;

FIG. 5 is a side schematic view of components of a suspension assembly for a washing machine appliance in accordance with one embodiment of the present disclosure;

FIG. 6 is a top schematic view of components of a suspension assembly for a washing machine appliance in accordance with one embodiment of the present disclosure;

FIG. 7 is a cross-sectional view of components of a suspension assembly for a washing machine appliance in an unloaded position in accordance with one embodiment of the present disclosure; and FIG. 8 is a cross-sectional view of components of a suspension assembly for a washing machine appliance in a loaded position in accordance with one embodiment of the present disclosure;

FIG. 9 is a perspective view of components of a suspension assembly for a washing machine appliance, including sensors oriented to measure distances generally parallel to a longitudinal axis of the rod, in accordance with one embodiment of the present disclosure;

FIG. 10 is a side schematic view of components of a suspension assembly for a washing machine appliance, including sensors oriented to measure distances generally parallel to a longitudinal axis of the rod, in accordance with one embodiment of the present disclosure;

FIG. 11 is a side schematic view of components of a suspension assembly for a washing machine appliance, including sensors oriented to measure distances generally perpendicular to a longitudinal axis of the rod, in accordance with one embodiment of the present disclosure;

FIG. 12 is a side view of components of a suspension assembly for a washing machine appliance, including sensors oriented to measure distances generally perpendicular to a longitudinal axis of the rod, in accordance with another embodiment of the present disclosure;

FIG. 13 is a perspective view of components of a suspension assembly for a washing machine appliance, including sensors oriented to measure distances generally parallel to a longitudinal axis of the rod, in accordance with yet another embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view partially broken away of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64.

As illustrated in FIG. 1, washing machine appliance 50 is a vertical axis washing machine appliance. While the present disclosure is discussed with reference to a vertical axis washing machine appliance, those of ordinary skill in the art, using the disclosures provided herein, should understand that the subject matter of the present disclosure is equally applicable to other washing machine appliances, such as horizontal axis washing machine appliances.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

FIG. 2 provides a front elevation schematic view of certain components washing machine appliance 50 including wash basket 70 movably disposed and rotatably mounted in wash tub 64 in a spaced apart relationship from tub side wall 68 and tub bottom 66. Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine appliance 50 and, when connected to a building plumbing system (not shown), provide a fresh water supply for use in washing machine appliance 50. Liquid valves 102, 104 and liquid hoses 106, 108 are connected to a basket inlet tube 110, and fluid is dispersed from inlet tube 110 through a nozzle assembly 112 having a number of openings therein to direct washing liquid into basket 70 at a given trajectory and velocity. A dispenser (not shown in FIG. 2), may also be provided to produce a wash solution by mixing fresh water with a known detergent or other composition for cleansing of articles in basket 70.

An agitation element 116, such as a vane agitator, impeller, auger, or oscillatory basket mechanism, or some combination thereof is disposed in basket 70 to impart an oscillatory motion to articles and liquid in basket 70. In various exemplary embodiments, agitation element 116 may be a single action element (oscillatory only), double action (oscillatory movement at one end, single direction rotation at the other end) or triple action (oscillatory movement plus single direction rotation at one end, single direction rotation at the other end). As illustrated in FIG. 2, agitation element 116 is oriented to rotate about a vertical axis 118.

Basket 70 and agitator 116 are driven by a motor 120 through a transmission and clutch system 122. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a motor assembly 148.

Basket 70, tub 64, and machine drive system 148 are supported by a vibration dampening suspension system. The dampening suspension system can include one or more suspension assemblies 92, as discussed herein, coupled between and to the cabinet 52 and wash tub 64. Typically, four suspension assemblies 92 are utilized, and are spaced apart about the wash tub 64. For example, each suspension assembly 92 may be connected at one end proximate a corner of the cabinet 52 and at an opposite end to the wash tube 64. In particular, one end of each suspension assembly 92 may be connected to a corner bracket of the cabinet 52, as discussed herein. The dampening suspension system can include other elements, such as a balance ring 94 disposed around the upper circumferential surface of the wash basket 70. The balance ring 94 can be used to counterbalance an out of balance condition for the wash machine as the basket 70 rotates within the wash tub 64. The wash basket 70 could also include a balance ring 96 located at a lower circumferential surface of the wash basket 70.

A dampening suspension system generally operates to dampen dynamic motion as the wash basket 70 rotates within the wash basket 64. The dampening suspension system has various natural operating frequencies of the dynamic system. These natural operating frequencies are referred to as the modes of suspension for the washing machine. For instance, the first mode of suspension for the washing machine occurs when the dynamic system including the wash basket 70, tub 64, and dampening suspension system are operating at the first resonant or natural frequency of the dynamic system.

Operation of washing machine appliance 50 is controlled by a controller 150 which is operatively coupled to the user interface input located on washing machine backsplash 56 (shown in FIG. 1) for user manipulation to select washing machine cycles and features. In response to user manipulation of the user interface input, controller 150 operates the various components of washing machine appliance 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism. After the agitation phase of the wash cycle is completed, tub 64 is drained with pump assembly 72. Laundry items are then rinsed and portions of the cycle may be repeated, including the agitation phase, depending on the particulars of the wash cycle selected by a user.

Referring now to FIGS. 3 through 13, exemplary embodiments of suspension assemblies 92 in accordance with various embodiments of the present disclosure are shown. A suspension assembly 92 in accordance with the present disclosure generally includes a frame and one or more mounts seated on the frame. Further, a rod may be coupled to the mount(s). The rod may extend away from the mount and generally be rotatable about a pivot point. For example, the rod may be coupled to the mount(s) at a first end thereof, and may be coupled to the tub at a second end thereof.

FIGS. 3 through 11 illustrate a suspension assembly in accordance with one embodiment of the present disclosure. Such suspension assembly 92 in accordance with these embodiments generally includes a first pliable mount and a second pliable mount which are generally spaced apart from each other, and further includes a rocker arm extending between and engaging the first and second pliable mounts. A rod may be connected at one end to the rocker arm. The pliable mounts may be coupled to the cabinet 52 of the washing machine appliance 50, and the distal end of the rod may be coupled to the tub 64, thus suspending the tub 64 with relative to the cabinet 52. Suspension assemblies in accordance with these embodiments advantageously provide reduced noise generation during operation, by reducing relative movement of the various components, such as relative movement of the rocker arm with respect to the first and second pliable mounts. The rocker arm instead may advantageously move as required due to tub movement, and the pliable mounts may deform as require to dampen and accommodate movement of the rocker arm that results from movement of the tub 64 during operation. In particular, the pliable mounts in accordance with these embodiments may maintain contact with the rocker arm generally constantly during operation. Additionally, pliable mounts, rocker arms, and pockets in which the pliable mounts may be seated may advantageously be designed to provide progressive contact and thus support to each other when experiencing increased force during operation, and may further be designed to reduce stress concentrations during such progressive contact.

As discussed, a suspension assembly 92 in accordance with these embodiments includes a first pliable mount 200 and a second pliable mount 202. The first and second pliable mounts 200, 202 are spaced apart from each other along a lateral direction L of the suspension assembly 92. First pliable mount 200 may include a hollow body 210 and a head 212, and second pliable mount 202 may similarly include a hollow body 214 and a head 216. The head 212, 216 of each pliable mount 200, 202 is integral with the respective hollow body 210, 214, such that each pliable mount 200, 202 is formed from a single, integral component. As shown, the hollow body 210, 214 of each mount 200, 202 may define an interior of the respective mount 200, 202. The head 212, 216, which may be above the hollow body 210, 214 of the respective mount 200, 202 along a vertical direction V of the suspension assembly 92, may be solid and thus not define an interior therein, or may optionally include define an interior.

In exemplary embodiments, the first pliable mount 200 and the second pliable mount 202 are each formed from an elastomer. For example, rubbers, including unsaturated and saturated rubbers, are particularly suitable for use in forming the first pliable mount 200 and the second pliable mount 202. Such materials advantageously provide the desired pliability which facilitates reduced noise and relative movement of the various suspension assembly 92 components.

The shapes of the first and second pliable mounts 200, 202 may additionally advantageously facilitate reduced noise and relative movement. For example, as shown in FIG. 6, at least a portion of the hollow body 210 of the first pliable mount 200 and at least a portion of the hollow body 214 of the second pliable mount 202 each have an elliptical cross-sectional profile. Accordingly, hollow body 210, such as the profile thereof, may define a long axis 220 and a short axis 222 perpendicular to the long axis 220. Similarly, hollow body 212, such as the profile thereof, may define a long axis 224 and a short axis 226 perpendicular to the long axis 224. Further, in exemplary embodiments, the long axis 220, 224 of each elliptical cross-sectional profile of each respective hollow body 210, 214 may extending along a transverse direction T of the suspension assembly 92. Notably, the lateral, vertical and transverse directions T may be mutually perpendicular, defining an orthogonal coordinate system for the suspension assembly 92.

In alternative embodiments, the long axes 220, 224 may extend along the lateral direction L, or in any other suitable direction between and in the plan defined by the lateral direction L and the transverse direction T. In still other alternative embodiments, the hollow body 210 of the first pliable mount 200 and the hollow body 214 of the second pliable mount 202, or at least portions thereof, each have a circular cross-sectional profile or a cross-sectional profile having any suitable shape.

Further, as shown in FIGS. 3 through 11, at least a portion of the hollow body 210 of the first pliable mount 200 and at least a portion of the hollow body 214 of the second pliable mount 212 are tapered, such as in the vertical direction V. In exemplary embodiments, such taper is towards the head 212, 216 of the respective mount 200, 202. Accordingly, the mounts 200, 202, such as the hollow bodies 210, 214 thereof, may have approximately conical shapes. Notably, the tapering surfaces may be curvilinear as shown or linear.

As further illustrated, the heads 212, 216 may be generally smaller in profile than the respective hollow bodies 210, 214. Specifically, in exemplary embodiments as shown, a maximum cross-sectional profile area of the hollow body 210 of the first pliable mount 200 is greater than a maximum cross-sectional profile area of the head 212 of the first pliable mount 200. Similarly, a maximum cross-sectional profile area of the hollow body 214 of the second pliable mount 202 is greater than a maximum cross-sectional profile area of the head 216 of the second pliable mount 202.

As further illustrated in FIGS. 3 through 11, a rocker arm 230 may engage the heads 212, 216 of the pliable mounts 200, 202, and may further extend between the pliable mounts 200, 202 along the lateral direction L. Rocker arm 230 may generally be formed from a rigid material, such as in exemplary embodiments a fiber reinforced polymer. Engagement of the rocker arm 230 with the heads 212, 216 may advantageously allow the rocker arm 230 to move as required during operation of washing machine appliance 50, with no or reduced movement of the rocker arm 230 relative to the mounts 200, 202. Instead, the mounts 200, 202 deform and move with the rocker arm 230 to facilitate such rocker arm 230 movement.

In exemplary embodiments, rocker arm 230 includes a body 232 which defines a first socket 234 and a second socket 236. Each socket 234, 236 may define an interior, respectively. The first socket 234 and second socket 236 may be spaced apart from each other, such as along the lateral direction L when the rocker arm 230 is disposed on the mounts 200, 202. As shown, the first socket 234 may surround at least a portion of the head 212 of the first pliable mount 200, such that this portion of the head 212 is disposed within the interior thereof. Further, the second socket 236 may surround at least a portion of the head 216 of the second pliable mount 202, such that this portion of the head 216 is disposed within the interior thereof. In exemplary embodiments as shown, the head 212, 216 may fill a substantial portion of the respective interior and be in touch with inner surfaces 235, 237 of the respective socket 234, 236, thus reducing or eliminating movement of the socket 234, 236 relative to the respective head 212, 216.

As further illustrated, a suspension assembly 92 in accordance with these embodiments may include a rod 240, which may extend between a first end 242 and a second end 246. The rod 240 may be connected to the rocker arm 230, such as at the first end 242. For example, the first end 242 may be generally hook shaped, and may hang from the rocker arm 230, as illustrated. The rod 240 may be disposed between the first pliable mount 200 and the second pliable mount 202 along the lateral direction L, such that the rod 240 generally hangs between the mounts 200, 202 along the lateral direction L. In exemplary embodiments, the rod 240 is connected to the rocker arm 230 via a snap fit or light interference fit, although any suitable connection is within the scope and spirit of the present disclosure. In exemplary embodiments, the connection between the rod 240 and rocker arm 230 is a rigid connection, such that there is no relative movement between the rod 240 and rocker arm 230 when connected.

The rod 240 may further be connected at its second end 244 to the tub 64 or to another component of the suspension assembly 92 which is in turn connected to the tub 64. For example, referring briefly to FIG. 1, suspension assembly 92 may additionally include a spring 250 or other damping component which may be connected to and between the second end 244 and the tub 64.

Movement of the rod 240, due to movement of the tub 64 during operation of the washing machine appliance 50, may thus cause movement of the rocker arm 230. For example, FIGS. 4, 5 and 9-11 illustrate various movements of the rocker arm 230 caused by movement of the tub 64. In particular, due to the interaction between the rocker arm 230 and the mounts 200, 202, rocker arm 230 may pivot or rotate due to movement of the tub 64. FIG. 4 illustrates rotation about the transverse axis T of the rocker arm 230 and resulting deformation of the mounts 200, 202 that results such that movement of the rocker arm 230 relative to the mounts 200, 202 is reduced or eliminated. Specifically, relative movement between outer surfaces 204, 206 of the mounts 200, 202 and surfaces of the rocker arm 230 that the outer surfaces 204, 206 are in contact with, such as inner surfaces 235, 237 of sockets 234, 236 is reduced or eliminated. FIGS. 5, 10 and 11 illustrates rotation about the lateral axis L of the rocker arm 230 and resulting deformation of the mounts 200, 202 that results such that movement of the rocker arm 230 relative to the mounts 200, 202 is reduced or eliminated. Specifically, relative movement between outer surfaces 204, 206 of the mounts 200, 202 and surfaces of the rocker arm 230 that the outer surfaces 204, 206 are in contact with, such as inner surfaces 235, 237 of pockets 234, 236 is reduced or eliminated.

FIGS. 7 and 8 further illustrate the relationship between the rocker arm 230 and the mounts 200, 202 during operation of the washing machine appliance 50. Only mount 200 is illustrated in FIGS. 7 and 8, but it should be understood that such disclosure applies equally to mount 202. FIG. 7 illustrates mount 200 seated in first pocket 264 and engaged with first socket 234 in an unloaded position. FIG. 8 illustrates mount 200 seated in first pocket 264 and engaged with first socket 234 in a loaded position. The pliable nature of the mounts 200, 202, which thus reduces or eliminates respective movement of the various components of the assembly 92, is thus illustrated by FIGS. 7 and 8 as well as FIGS. 4 and 5.

Suspension assemblies 92 in accordance with these embodiments may further include a frame 260. The first pliable mount 200 and the second pliable mount 202 may be seated on the frame 260. In exemplary embodiments, as shown in FIG. 3, frame 260 may be a corner bracket of the cabinet 52 of the washing machine appliance 50, and the frame 260 may thus connect the suspension assembly 92 to the cabinet 52. Alternatively, the frame 260 may be component that is separate from the corner bracket, and which may connect to the corner bracket or otherwise connect to the cabinet 52.

In exemplary embodiments as illustrated, frame 260 may include a body 262, which may define a first pocket 264 and a second pocket 266. Each pocket 264, 266 may define an interior, respectively, which may be defined by inner surfaces 265, 267, respectively. The first pocket 264 and second pocket 266 may be spaced apart from each other, such as along the lateral direction L when the first pliable mount 200 and the second pliable mount 202 are seated on the frame 260. As shown, the first pocket 264 may surround at least a portion of the hollow body 210 of the first pliable mount 200, such that this portion of the hollow body 210 is disposed within the interior thereof. Further, the second pocket 266 may surround at least a portion of the hollow body 214 of the second pliable mount 202, such that this portion of the hollow body 214 is disposed within the interior thereof. In exemplary embodiments as shown, the hollow body 210, 214 may fill a substantial portion of the respective interior and be in touch with inner surface 265, 267 of the respective pocket 264, 266, thus reducing or eliminating movement of the hollow body 210, 214 with respect to the respective pocket 264, 266. Specifically, during operation, the area of contact between the outer surfaces 204, 206 of the mounts 200, 202 and the inner surface 265, 267 of the pockets 264, 266 may progressively increase as the load carried by the mounts 200, 202 increases (and vice versa), thus reducing or eliminating relative movement between these surfaces. Such progressive increase and decrease in the area of contact between these surfaces advantageously reduces or eliminates the formation of large stress gradients in the mounts 200, 202, thereby reducing accumulated damage to the mounts 200, 202 due to repeated load cycles.

Referring now to FIG. 12, another embodiment of a suspension assembly in accordance with the present disclosure is provided. As shown, such suspension assembly 92 in accordance with these embodiments includes a frame 360 which may defines a pocket 364. A mount 300 may be seated on the frame 360, such as in the pocket 364. In these embodiments, the mount 300 is or includes a spring, such as a tapered coil spring as illustrated. Portion of the mount 300 may be movable relative to other portions (for example, seated portions) in a generally elastic, spring-like manner as required to facilitate movement of the rod 240 during appliance 50 operation. Rod 240, such as the first end 242 thereof, may be coupled to the mount 300 and extend therefrom.

Referring now to FIG. 13, another embodiment of a suspension assembly in accordance with the present disclosure is provided. As shown, such suspension assembly 92 in accordance with these embodiments includes a frame 460, which may define a pocket 464. A mount 400 may be seated on the frame 460, such as in the pocket 464. In these embodiments, the mount 400 is a rigid mount. For example, the mount 400 may be formed from a suitable hard plastic (such as a fiber reinforced polymer) that is generally not pliable or elastic. Mount 400 in these embodiments may, for example, include a generally spherical or dome-shaped portion 402 and a flange 404 extending from this portion 402. The mount 400 generally, and specifically the generally spherical or dome-shaped portion 402 thereof, may be movable within the pocket 464, such as in a "ball and socket" manner, as required to facilitate movement of the rod 240 during appliance 50 operation. Rod 240, such as the first end 242 thereof, may be coupled to the mount 400 (such as via a direct connection to the mount 400 as shown) and extend therefrom.

As discussed above, improved apparatus for monitoring movement of the tub 64 during operation of the washing machine appliance 50 would be desirable. Accordingly, and as illustrated in FIGS. 9 through 13, suspension assemblies 92 in accordance with the present disclosure may further include sensor assemblies 500 which are operable to monitor rotation of the associated rods 240 of the suspension assemblies 92. As discussed herein, a sensor assembly 500 in accordance with the present disclosure may include one or more sensors 502 and one or more reference surfaces 504. A reference surface 504 in accordance with the present disclosure is generally a surface that an associated sensor 502 is spaced from and measures distances from. The sensors 502 may measure reference distances 506 from the reference surfaces 504 during operation of the appliance 50 and associated movement of the rod 240. The sensors 502 or the reference surfaces 504 may be coupled to the rod 240 and thus movable therewith, while the other of the sensors 502 or reference surfaces 504 may be generally fixed, such that the reference distances 506 measured by the sensors change due to rotation of the rod 240 about a pivot point 246 thereof. Notably, pivot point 246 can be fixed or movable depending on the fixed or movable nature of the rod 240.

In general, any suitable sensor capable of measuring a distance from another surface that the sensor is spaced apart from can be utilized as a sensor 502 in accordance with the present disclosure. In some embodiments, sensors 502 may for example be reflective sensors, which generally include an infrared emitting diode and a phototransistor. In other embodiments, sensors 502 may for example be inductive sensors.

Notably, rod 240 extends along a longitudinal axis 248. The sensors 502 and reference surfaces 504 may be oriented such that the reference distances 506 are measured in a desired orientation relative to the longitudinal axis 248. The changes in reference distances 506 can be correlated to the movement of the rod 240, such as to angles of rotation 249 of the rod 240. For example, sensors 502 may be in communication with controller 150, and may transmit the reference distances to the controller 150. The controller 150 may utilize these reference distances 506, as well as predetermined information about the orientation of the sensors 502 relative to, for example, the longitudinal axis 148 of the rod 240, to calculate or estimate angles of rotation 249 of the rod 240. These angles of rotation 249 can in turn provide information related to movement of the tub 64. For example, if an angle or rotation 249 meets or exceeds a predetermined limit, this may indicate the existence of an out-of-balance load.

As shown, in exemplary embodiments, sensors 502 or reference surfaces 504 which are coupled to the rod 240 are coupled to the first end 242 of the rod 240. As discussed, the rod 240 may rotate about a pivot point 246. An angle of rotation 249 of the rod 240 (and changes in the angle 249 thereof) may thus be defined for the second end 244 of the rod 240. The angle of rotation 249 (and changes in the angle 249 thereof) may for example be defined relative to the position of the rod 240, and second end 244, when the appliance 50 is at rest.

In some embodiments, as illustrated for example in FIGS. 9 through 12, the sensor(s) 502 may be coupled to the rod 240. In other embodiments, as shown in FIG. 13, the reference surface(s) 504 may be coupled to the rod 240. The component coupled to the rod 240 is, as discussed, generally movable (such as rotatable) with and due to movement (such as rotation) of the rod 240.

As shown in FIGS. 9 through 12, for example, a sensor 502 may be connected to an extension member 510, which may simply be a rigid member 510. For example, one end of the extension member 510 may be connected to the sensor 502, and the other end may be coupled to the rod 240. In some embodiments as shown in FIGS. 11 and 12, the extension member 510 may be connected to the rod 240 to couple the sensor 502 to the rod 240. In other embodiments, the extension member 510 may be connected to another component that is movable with the rod 240, such as the rocker arm 230 as shown in FIGS. 9 and 10, to couple the sensor 402 to the rod 240. In alternative embodiments, a sensor 502 may be directly coupled to the rod 240, rocker arm 230, etc., rather than requiring an extension member 510.

As further shown in FIGS. 9 and 10, in some embodiments the reference surface 504 may be the frame 260, 360, 460. In alternative embodiments, the reference surface 504 may be a rigid member 512. As shown, the rigid member 512 may be connected to an extend from the frame 260, 360, 460, such that the rod 240 moves relative to the rigid member 512 and frame 260, 360, 460 during operation.

Notably, in alternative embodiments of those illustrated in FIGS. 9 through 12, the sensor(s) 502 and reference surface(s) 504 can be switched, such that the reference surface(s) 504 are movable with the rod 240 relative to the sensor(s) 502.

Referring now to FIG. 13, in some embodiments the sensor 502 may be coupled to the frame 260, 360, 460. The sensor 502 may be directly connected to the frame 260, 360, 460 as shown, or can be coupled to the frame 260, 360, 460 via an extension member 510 as discussed above. Further, and referring still to FIG. 13, in some embodiments the reference surface 504 may be the mount 200, 300, 400. In the embodiment shown in FIG. 13, the reference surface 504 is the flange 404 of mount 400.

Notably, in alternative embodiments of those illustrated in FIG. 13, the sensor(s) 502 and reference surface(s) 504 can be switched, such that the sensor(s) 502 are movable with the rod 240 relative to the reference surface(s) 504.

As discussed, one or more sensors 502 may be utilized in a sensor assembly 500. In some embodiments, such as those illustrated in FIGS. 11, 12 and 13, only a single sensor 502 may be required (although multiple sensors 502 may be utilized). In other embodiments, as illustrated in FIGS. 9 and 10, multiple sensors 502 may be utilized. In particular, for example and as discussed herein, the reference distances 506 measured by multiple sensors 502 may be utilized together to correlate with an angle of rotation 249 of a rod 240. When multiple sensors 502 are utilized, they may for example be spaced apart in an array about the longitudinal axis 248 of the rod 240. Notably, in exemplary embodiments sensors 502 may be equally spaced apart in such an array. Accordingly, two sensors may be approximately 180 degrees from each other in an array, three sensors may be approximately 120 degrees from each other in an array, four sensors may be approximately 90 degrees from each other in an array, etc. Notably, in some exemplary embodiments, multiple sensors 502 may be positioned in a plane that is perpendicular (as illustrated in FIGS. 9 and 10) or parallel to the longitudinal axis 248.

As discussed, sensors 502 and reference surfaces 504 can be oriented relative to the longitudinal axis 248 of the rod 240 to facilitate correlation of the measured reference distances 506 and changes therein. For example, in some embodiments, as illustrated in FIGS. 9, 10, and 13, a sensor 502 and reference surface 504 may be oriented such that the sensor 502 measures reference distances 506 from the reference surface 504 that are generally parallel to the longitudinal axis 248 of the rod. These references distances 506, and the changes therein, can be correlated to an angle of rotation of 249 of the rod 240 about the pivot point 246 thereof. In other embodiments, as illustrated in FIGS. 11 and 12, a sensor 502 and reference surface 504 may be oriented such that the sensor 502 measures reference distances 506 from the reference surface 504 that are generally perpendicular to the longitudinal axis 248 of the rod. These references distances 506, and the changes therein, can be correlated to an angle of rotation of 249 of the rod 240 about the pivot point 246 thereof. Notably and advantageously, the arrangement of sensors 502 and reference surfaces 504 can be configured so that the sensors 502 and resulting measurements and calculations are not sensitive to the effects weight changes in the tub 64 supported by the suspension assembly 92, even in embodiments which utilize pliable or elastic mounts.

For example, in some embodiments, a reference distance 506 of a single sensor 502 can be correlated to an angle of rotation 249 by multiplying the reference distance 506 by a constant (which may for example be empirically determined). In particular, such relationship can be utilized in embodiments wherein both the sensor 502 and reference surface 504 are coupled to rigid components when the reference distance 506 from the reference surface 504 is generally parallel to the longitudinal axis 248, as illustrated for example in FIG. 13 wherein the mount is a rigid mount. Additionally, such relationship can be utilized in embodiments wherein the reference distance 506 from the reference surface 504 is generally perpendicular to the longitudinal axis 248, as illustrated for example in FIGS. 11 and 12. In these embodiments, due to the use of rigid components or the perpendicular orientation, weight changes in the tub 64 do not substantially affect the reference distances 506 measured by the sensors 502.

In other embodiments, multiple reference distances 506 of multiple sensors 502 can be correlated to an angle of rotation 249. For example, two opposing sensors 502 as illustrated in FIGS. 9 and 10 can be correlated to an angle of rotation 249 by obtaining a difference between the reference distances 506, and multiplying this result by a constant (which may for example be empirically determined). In particular, such relationship can be utilized in embodiments wherein the sensors 502 or reference surface 504 are coupled to pliant or elastic components, as illustrated for example in FIGS. 9 and 10 wherein the mount is a pliant mount. Notably, these arrangements of sensors 502 and reference surfaces 504 make it possible to exclude the changes in the references distances 506 measured by the sensors 502 that are caused by change in the weight supported by the suspension assembly 92. For example, the weight change is proportional to the sum of the changes of two equally spaced sensors 502, and the angle of rotation 249 is proportional to the difference in the changes for the same sensors 502. Accordingly, even when utilizing pliant or elastic components and parallel orientations, the arrangement of sensors 502 and reference surfaces 504 can be configured so that the sensors 502 and resulting measurements and calculations are not sensitive to the effects weight changes.

It should be understood that any suitable orientation of the sensor(s) 502 and reference surface(s) 504 is within the scope and spirit of the present disclosure. Reference distances 506 measured by the sensors 502 can advantageously be utilized to monitor rotation of the associated rod 240 of a suspension assembly 92, and can thus be utilized to monitor movement of the tub 64 during appliance 50 operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A suspension assembly for suspending a tub in a washing machine appliance, the suspension assembly comprising:
   a frame;
   a first mount and a second mount each seated on the frame, the first mount and second mount spaced apart from each other along a lateral direction;
   a rod coupled to the first mount and the second mount, the rod rotatable about a pivot point;

a rocker arm engaging the first mount and the second mount, the rocker arm extending between the first mount and the second mount along the lateral direction, and wherein the rod is connected to the rocker arm and disposed between the first mount and the second mount along the lateral direction; and a sensor assembly operable to monitor rotation of the rod, the sensor assembly comprising a sensor and a reference surface, one of the sensor or the reference surface coupled to the rod and rotatable with the rod relative to the other of the sensor or the reference surface, the sensor operable to measure reference distances from the reference surface.

2. The suspension assembly of claim 1, wherein the rod extends between a first end and a second end and is coupled to the first mount and the second mount at the first end, and wherein the one of the sensor or the reference surface is coupled to the rod at the first end.

3. The suspension assembly of claim 1, wherein the sensor and reference surface are oriented such that the sensor measures reference distances from the reference surface that are generally parallel to a longitudinal axis of the rod.

4. The suspension assembly of claim 1, wherein the sensor and reference surface are oriented such that the sensor measures reference distances from the reference surface that are generally perpendicular to a longitudinal axis of the rod.

5. The suspension assembly of claim 1, wherein the sensor is coupled to the rod and rotatable with the rod relative to the reference surface.

6. The suspension assembly of claim 5, wherein the reference surface is the frame.

7. The suspension assembly of claim 5, wherein the reference surface is a rigid member connected to and extending from the frame.

8. The suspension assembly of claim 1, wherein the reference surface is coupled to the rod and rotatable with the rod relative to the sensor.

9. The suspension assembly of claim 1, wherein the sensor is a plurality of sensors.

10. The suspension assembly of claim 9, wherein the plurality of sensors are spaced apart in an array about a longitudinal axis of the rod.

11. The suspension assembly of claim 1, wherein the first mount and the second mount are each a pliable mount.

12. The suspension assembly of claim 11, wherein the first mount and the second mount are each formed from an elastomer.

13. A washing machine appliance, the washing machine appliance comprising:

a cabinet;

a tub disposed within the cabinet; and a plurality of suspension assemblies suspending the tub within the cabinet, each of the plurality of suspension assemblies comprising:

a frame;

a first mount and a second mount each seated on the frame, the first mount and second mount spaced apart from each other along a lateral direction;

a rod coupled to the first mount and the second mount, the rod rotatable about a pivot point;

a rocker arm engaging the first mount and the second mount, the rocker arm extending between the first mount and the second mount along the lateral direction, and wherein the rod is connected to the rocker arm and disposed between the first mount and the second mount along the lateral direction; and a sensor assembly operable to monitor rotation of the rod, the sensor assembly comprising a sensor and a reference surface, one of the sensor or the reference surface coupled to the rod and rotatable with the rod relative to the other of the sensor or the reference surface, the sensor operable to measure reference distances from the reference surface.

14. The washing machine appliance of claim 13, wherein the sensor and reference surface are oriented such that the sensor measures reference distances from the reference surface that are generally parallel to a longitudinal axis of the rod.

15. The washing machine appliance of claim 13, wherein the sensor and reference surface are oriented such that the sensor measures reference distances from the reference surface that are generally perpendicular to a longitudinal axis of the rod.

16. The washing machine appliance of claim 13, wherein the sensor is a plurality of sensors.

* * * * *